Figure 1:
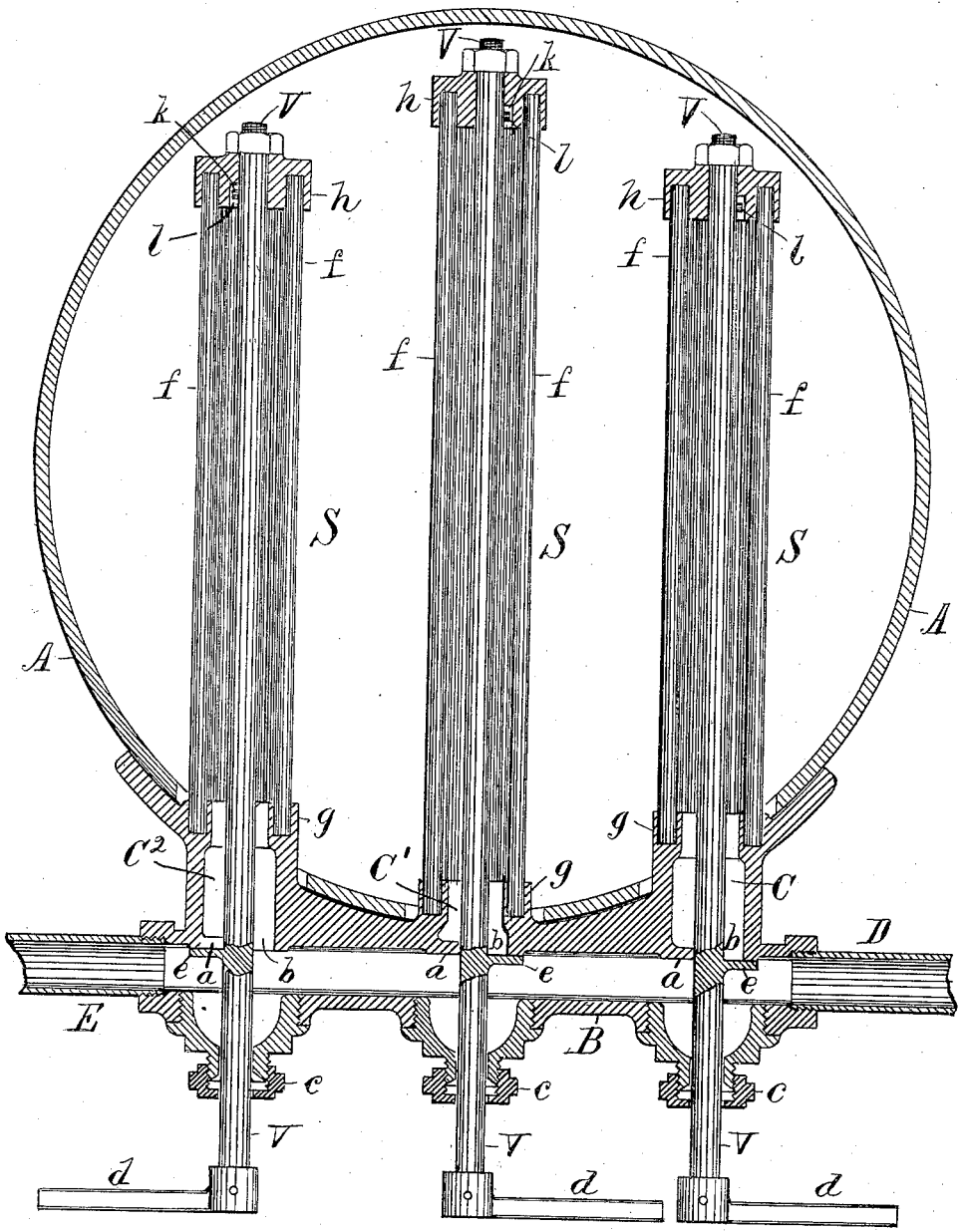

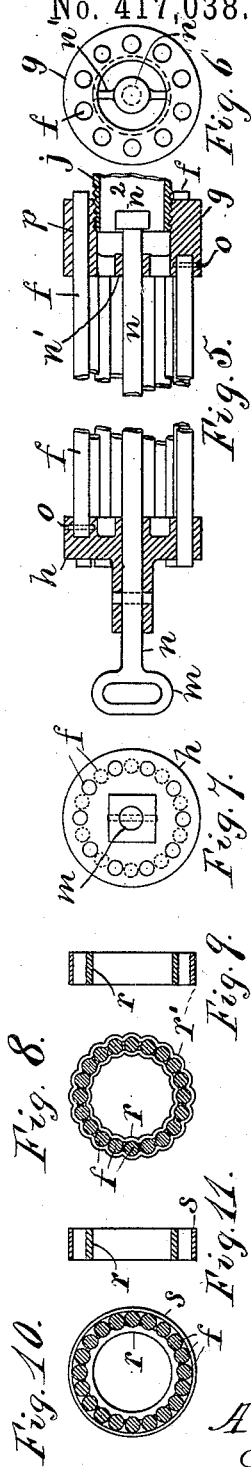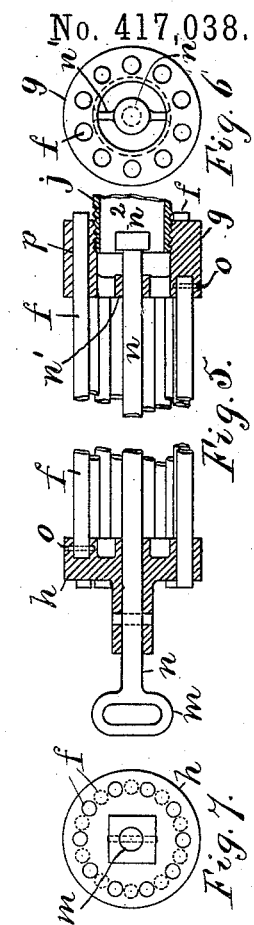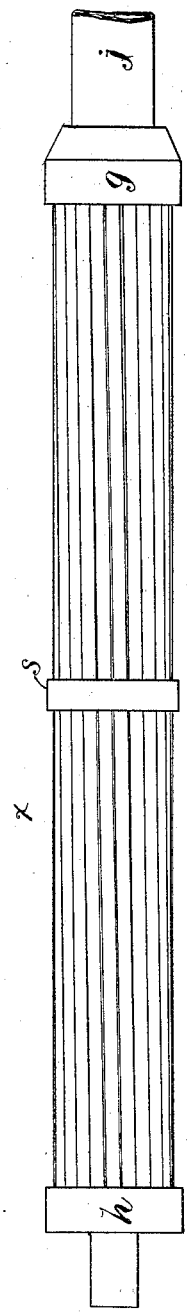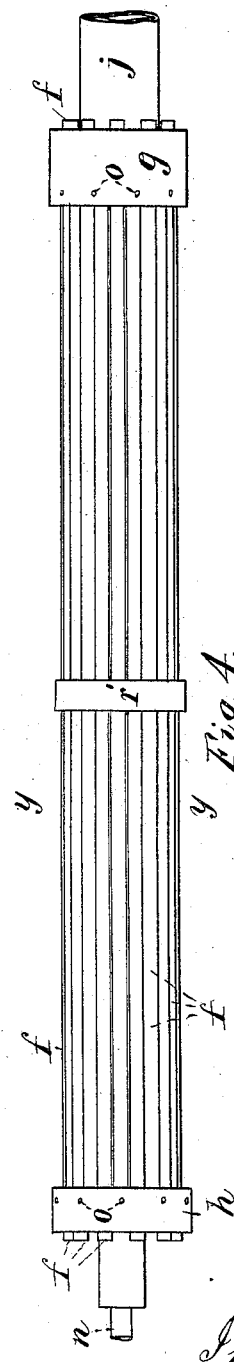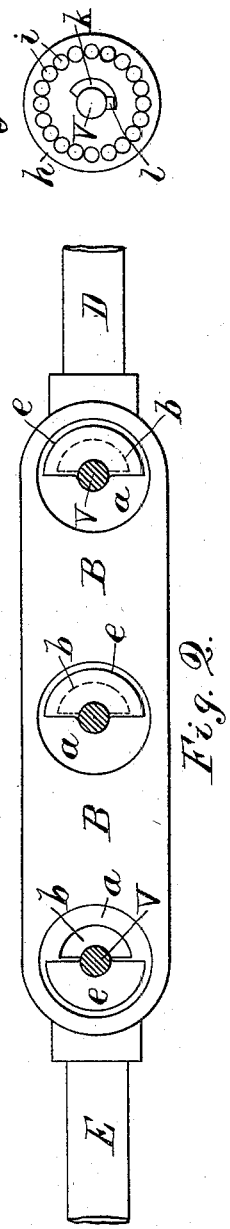

UNITED STATES PATENT OFFICE.

JOHN W. HYATT, OF NEWARK, NEW JERSEY, ASSIGNOR TO THE HYATT PURE WATER COMPANY, OF SAME PLACE.

FILTER-STRAINER.

SPECIFICATION forming part of Letters Patent No. 417,038, dated December 10, 1889.

Application filed December 20, 1888. Renewed August 22, 1889. Serial No. 321,561. (No model.)

*To all whom it may concern:*

Be it known that I, JOHN W. HYATT, a citizen of the United States, residing at Newark, Essex county, New Jersey, have invented certain new and useful Improvements in Filter-Strainers, fully described and represented in the following specification and the accompanying drawings, forming a part of the same.

The object of this invention is to furnish a durable and effective strainer for fluid substances, and one in which the straining-apertures can be readily cleansed without removal from the apparatus.

The invention is particularly adapted to sustain the granular filter-beds used in various filters and to prevent the escape of the sand or fine granular material to the filter-outlet.

The invention consists in a series of round straight rods arranged adjacent to one another, with intermediate longitudinal slits or apertures adjusted to permit the passage of the fluid and to prevent the escape of the granular filtering material. The series of rods is preferably arranged in the form of a cylindrical bundle, and the interspaces may be cleansed of any obstructing substance or of any mineral deposit formed therein by moving the rods upon one another, as by a lateral or longitudinal motion. Both constructions are shown in the annexed drawings, in which—

Figure 1 represents the application of three strainers to a cylindrical filter-casing, the view being taken in a horizontal section through the center of the strainers and their outlet-connections. Fig. 2 is a view (upon the ends of the valve-rods shown in Fig. 1) of the inlet-trunk, with the caps removed to show the valves seated therein. Fig. 3 is a side view of a strainer constructed as shown in Fig. 1, with the rods adapted for a lateral movement. Fig. 4 is a side view of a strainer with the rods adapted for longitudinal movement. Fig. 5 is a central section of a strainer shown in Fig. 4, the middle portion being broken away for want of space. Fig. 6 is a view at the outlet end of such strainer, and Fig. 7 is an end view of the opposite head. Fig. 8 is a transverse section on line $x x$ in Fig. 3, showing the supporting-bands at the middle of the length of the strainer; and Fig. 9 is a longitudinal section of such bands. Fig. 10 is a section of an alternative construction for such bands, taken on line $y y$ in Fig. 4; and Fig. 11 is a longitudinal section of such bands. Fig. 12 is a view upon the inner side of the head $k$, (shown at the inner ends of the strainers in Fig. 1,) illustrating the pin and slot connecting the valve-rod with the head.

A represents a cylindrical filter-casing; B, a trunk connected therewith and provided with three branches C C' C², leading the water within the filter-casing. The outlet-strainers (marked S in Fig. 1) are shown connected with these branches, and during the filtering operation the filtered water would pass freely from such strainers to the trunk and out through any suitable outlet-pipe. When washing the filter, a reverse current would be supplied through any suitable inlet-pipe. D represents such inlet-pipe, and E an outlet-pipe.

In washing a filter in sections the current would be reversed through the filter by closing by the outlet and supplying water to the inlet, the entire current being diverted to a single strainer by closing the connection from such inlet to the other strainers. In Fig. 1 the means for thus diverting the current is combined with the means for agitating the strainer-rods by connecting a valve-rod which controls the passage of the fluid to the strainer with a head attached to one end of the strainer-rods. Seats are shown formed within the trunk and provided with inlet-passages $b$, connecting with the branches C C' C², and valve-rods V are shown inserted through the seats $a$ and extended outside the trunk through stuffing-box $c$, and provided externally with handles $d$. The valve-passages $b$ are shown of segmental form, and valve plates or segments $e$ are formed upon the valve-rods to cover such passages when turned over the same.

In Figs. 1 and 2 the two valves at the right are shown turned over the inlet-passages, and the valve at the left turned away from such passage to admit water to the single strainer connected to the branch C. The strainers are shown with a fixed head $g$ and a movable head $h$, each head being formed with an annular series of holes $i$ in close proximity to one another to receive the strainer-rods $f$ and hold them at a small distance apart to permit the passage of the fluid through them.

The head $g$ is shown in Fig. 1 formed integral with the branches attached to the trunk B; but in Figs. 3, 4, and 5 the heads are formed as collars secured upon the ends of pipes $j$, which form the connection with the interior of the strainer.

The head $h$ in Figs. 1 and 3 is adapted to rotate or oscillate back and forth to turn the rods in a spiral position, as shown in Fig. 3, and to thus loosen or remove any obstructions between the rods. The movable heads $h$ are shown in Figs. 1 and 12, fitted loose to turn upon the valve-rods V, and are arranged to be rotated when the valve-rods are turned to open and close the passage $b$ by means of pins $l$, projecting from the valve-rods within segmental slots $k$, formed in the heads $h$.

The valve-rods, as will be noticed in Fig. 2, are turned one-half a revolution to open and close the passage $b$, whereas the head $h$ can only be turned to move the rods through a small angle, the amount of which is regulated by the fitting of the rods with a certain degree of latitude in the holes $i$ in the head $h$.

By the construction shown in Fig. 12 the rod V may be turned nearly half a revolution while the pin $l$ moves freely in the slot $k$, and then near the end of its movement the pin operates upon the head to shift the ends of the rods, so as to loosen the obstructions in the desired manner.

By turning the rod V one-half a rotation alternately in each direction for any desired number of times the head $h$ and one end of each of the rods may be twisted back and forth to agitate them to any desired extent.

The valves $e$ are shown adjusted in Figs. 1 and 2, as when washing the filter with a reversed current, the outlet E being then closed and the fluid admitted by the pipe D being diverted exclusively through the branch $C^2$ to wash the left-hand portion of the filter-bed. To wash the other sections of the filter the valves E would be turned to open the branches C and C' singly, in succession, and at the close of the washing operation the pipe D would be closed and the valves E would all be opened to permit the filtered fluid to escape from all of the strainers S simultaneously to the outlet E. Each movement of the valve-stems would, with the construction shown, operate to twist the heads $h$, and thus agitate the rods $f$, by which means the operator would, by the mere manipulation of the valves to wash the filter, secure the proper agitation of the rods $f$, and thus cleanse their interspaces in the desired manner.

It is obviously immaterial how the rods be moved upon or past one another to dislodge any obstructions that may form or center in the interspaces, and they may therefore be shifted longitudinally, as shown in Figs. 4, 5, 6, and 7, where the discharge-pipe $j$ for each strainer is shown provided with a fixed collar or head $g$, having the ends of one-half the rods secured therein, as by pins $o$, and the intermediate rods $f$ fitted loosely in the holes $p$, so as to move longitudinally therein. The movable head $h$ has the rods $f$ fitted thereto in like manner, and provided with a handle $m$ to move it longitudinally, so that the reciprocation of the handle operates to move each alternate rod longitudinally and dislodge any obstructions between the rods in the desired manner.

To regulate the movement of the head $h$, the handle is shown formed with a central rod $n$ fitted to a bridge $n'$ in the head $g$, and provided with a collar $n^2$ to determine its stroke.

In Fig. 6 only the ends of the rods which slide loosely in the head $g$ are shown; but in Fig. 7 the movable rods are shown in full lines and the rods held in the head by the pins $o$ are shown in dotted lines.

Where the strainers are required of such length that the rods would yield laterally, bands may be applied to the middle of their length and fitted partly around each rod to hold them at the desired distances apart. Such bands may be applied to and fitted partly around each rod, upon both the inner and outer sides of the rods, as shown in the bands $r$ $r'$ in Figs. 8 and 9; or the inner band $r$, notched externally to shift the rods apart, with proper interspaces, may be used in conjunction with a plain outer band $s$, operating simply to hold the rods in the notches of the band $r$.

The round rods which constitute my strainer are shown herein arranged in the form of an annular bundle, as is shown most clearly in Figs. 8 and 10; but it is immaterial how the rods be arranged provided they are supported with fine interspaces and combined with means for agitating or sliding the rods in some manner to dislodge any obstructions that may form or center in the interspaces.

It is preferable that the rods should be round to practice my invention, that the interspaces may not become clogged by permanent obstructions, and such clogging is wholly prevented by the tapering form of the interspaces, which is secured by the proximity of the rounded surfaces of the rods.

Having thus set forth my invention, what I claim is—

1. A strainer for filters, consisting in a series of rods sustained in heads with suitable interspaces, and movable upon one another to dislodge obstructions, substantially as herein set forth.

2. A strainer for filters, consisting in an annular bundle of rods with suitable interspaces, and movable upon one another to dislodge obstructions, substantially as herein set forth.

3. A strainer for filters, consisting in an annular bundle of rods sustained in heads with suitable interspaces, and movable upon one another to dislodge obstructions, and provided with a supporting-band notched to hold the rods in place intermediate to the heads, substantially as herein set forth.

In testimony whereof I have hereunto set my hand in the presence of two subscribing witnesses.

JOHN W. HYATT.

Witnesses:
  THOS. S. CRANE,
  L. LEE.